United States Patent [19]

Spencer et al.

[11] 4,161,779

[45] Jul. 17, 1979

[54] DYNAMIC PRIORITY SYSTEM FOR CONTROLLING THE ACCESS OF STATIONS TO A SHARED DEVICE

[75] Inventors: David H. Spencer, Lebanon; Edward A. Becker, Somerset, both of N.J.

[73] Assignee: Burroughs Corporation, Detroit, Mich.

[21] Appl. No.: 855,855

[22] Filed: Nov. 30, 1977

[51] Int. Cl.² .............................................. G06F 3/04
[52] U.S. Cl. ..................................................... 364/200
[58] Field of Search ... 364/200 MS File, 900 MS File; 340/147 LP; 179/15 AL

[56] References Cited

U.S. PATENT DOCUMENTS

| 3,244,805 | 4/1966 | Evans, Jr. ............... 340/147 R X |
| 3,333,252 | 7/1967 | Shimabukuro ................. 364/200 |
| 3,553,656 | 1/1971 | Bernhardt .................. 340/147 LP |
| 3,818,447 | 6/1974 | Craft .......................... 364/200 X |
| 3,832,689 | 8/1974 | Means et al. ............... 340/147 LP |

*Primary Examiner*—Gareth D. Shaw
*Assistant Examiner*—Thomas M. Heckler
*Attorney, Agent, or Firm*—James E. Ledbetter; Robert J. Gaybrick; Edward J. Feeney, Jr.

[57] ABSTRACT

A system for interfacing a plurality of stations with a shared device by granting access to the device in the order of requests from the stations. The system elements are serially interconnected for bidirectional communication between the stations and the shared device. Each station employs a register to store a value representing the relative access priority of that station for the shared device. Whenever a station seeks access to the shared device its register is reset to zero and a count-up signal is propagated to all other waiting stations to cause them to increment the values in their registers. When the shared device again becomes available for access the values in the registers are transferred within each station to race counters where they are counted up by a clock until one of the terminals reaches a predetermined maximum count and is granted access to the shared device. When the shared device becomes unavailable the race counters in the other stations are reset and the starting values are returned to the registers. By resetting the requesting station's register to zero and incrementing the registers of all other waiting stations the sequence of granting access to the shared device is maintained in the same order as the requests for access.

19 Claims, 12 Drawing Figures

DYNAMIC PRIORITY SYSTEM FOR CONTROLLING THE ACCESS OF STATIONS TO A SHARED DEVICE

FIELD OF THE INVENTION

The invention relates with particularity to a priority ordering system for granting access to one of a plurality of requesting stations to a shared device according to the ordering of the access requests.

BACKGROUND OF THE INVENTION

There have been many prior art techniques for assigning relative priorities between plural units requesting access to a single shared device. Some of these prior art techniques have contemplated assigning a fixed priority number of each of the units such that they always retain the same priority level when they request access to the shared device. An example of this would be assigning high priority numbers to selected units which are desired to have priority over all other requesting units for the shared device. While this method of assigning priorities is effective when fixed priorities are suitable for the particular application, it does have the disadvantage of being inflexible if the situation arises when a different order of priorities is desired. Normally this requires either reprogramming or rewiring of the individual units to establish their priority level at a different value.

Another priority technique for establishing priority of access to a shared device has been by the accumulated time method. This method contemplates accumulating within each requesting device the elapsed time from when the request for access for that device was first initiated and the current time. Access to the shared device is then allocated according to the period of time the units have been waiting for access with the unit waiting the longest being given the first access. This method is effective to establish dynamic priority access to a shared device because the priority of each of the units is determined by the particular sequence of access requests generated by the units. This method, however, is frequently undesirable because of the complications in accumulating in each unit the time since its last access request and the need to have an intelligent device poll the waiting units to access their elapsed time accumulators and determine by some algorithm which unit will next be granted access to the shared device. One skilled in the art will readily recognize that while there is dynamic priority ordering in the second method there is a significant overhead both in processing time and hardware requirements in implementing such a priority scheme.

SUMMARY OF THE INVENTION

It is an object of this invention to provide a dynamic priority ordering system for granting a plurality of requesting stations access to a shared device in the order of their requests.

It is another object of this invention to provide a dynamic priority ordering system which permits the requesting units to bidirectionally communicate with each other and with the shared device to enable accesses in the order of requests.

It is a further object of this invention to provide a dynamic priority ordering system which employes a queue counter within each requesting unit to store the priority of its associated request and a race counter which begins counting from the value stored in the queue counter and upon reaching a maximum count prior to any other requesting unit obtaining access to the shared device.

It is yet another object of this invention to provide a dynamic priority ordering system which operates without the requirement of a central coutrol to grant access to one of a plurality of requesting units according to the order of the requested.

Another object of this invention is to provide a dynamic priority ordering system wherein no two requesting units will have the same assigned priority.

These and other objects are accomplished by a priority ordering system which employs two counting units within each requesting unit which are actuable to determine whether the access to a shared device is to be granted to its associated requesting unit. The requesting units are serially interconnected with each other and the shared device for bidirectional communication therebetween. The units contain a queue counter and a race counter for storing priority data, and a memory for storing data to be transferred to the shared device. When a unit is ready to transfer the information accumulated in its memory to the shared device it resets its queue counter to zero and propogates a count-up pulse to the other units to increment their respective queue counters. When the shared device becomes idle the requesting units transfer their queue count to their race counter and a race is initiated with the first unit whose race counter reaches a maximum count being granted access to the shared device and the remaining units having their races discontinued and their queue counters restored to their values before the race was initiated. In this manner no two units are ever assigned the same priority.

The novel features which are believed to be characteristic of this invention are set forth with particularity in the appended claims. The invention itself, however, both in its organization and method of operation together with further objects and advantages thereof may best be understood with reference to the following description when taken in connection with the accompanying drawings.

DETAILED DESCRIPTION OF THE PREFERRED EMBODIMENT

Figure 1:
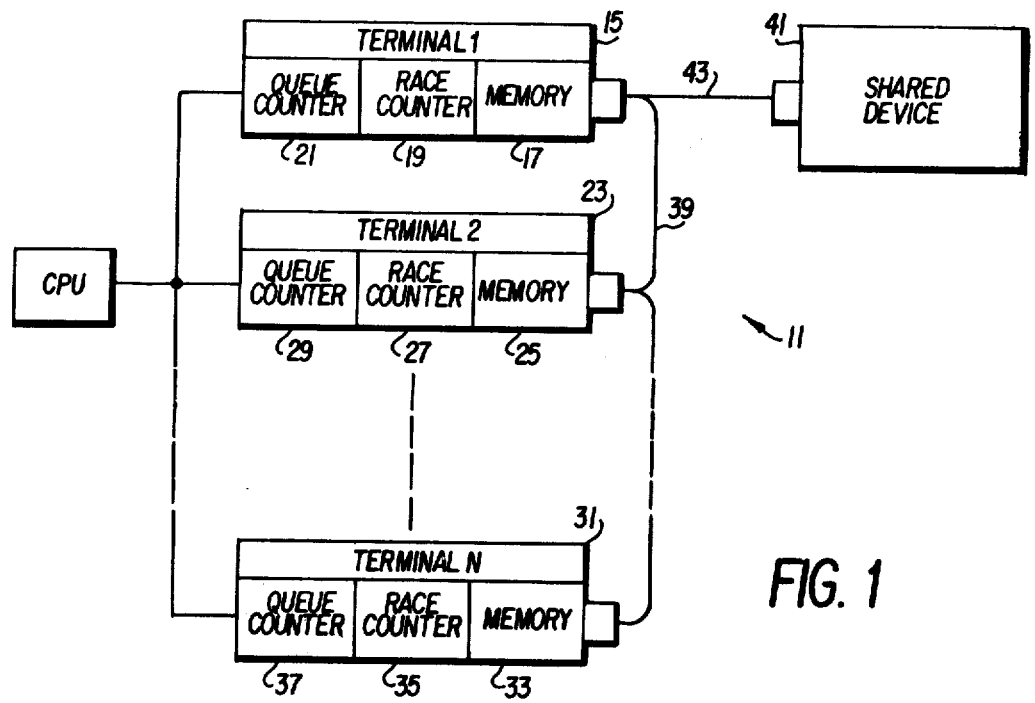
FIG. 1 is a schematic representation of the requesting units interconnected with each other and the shared device.

Referring to FIG. 1 the system 11 is shown as comprising stations 15, 23 and 31 serially interconnected by line 29. These stations are likewise serially connected to a shared device such as printer 41 over line 43. A central computer (CPU) is interconnected with the stations for bidirectional flow of data and control signals. Station 15 comprises a memory 17, race counter 19 and queue counter 21. The information to be transferred to the shared device 41 from station 15 upon a request for access is stored in memory 17. The race counter 19 and queue counter 21 control, as will herinafter be described, the access of station 15 to the shared device 41. Similarly, station 23 includes a memory 25, race counter 27 and queue counter 29. Station 31 represents the last station serially interconnected over line 39 and not necessarily the third station. Station 31 also includes a memory 33, race counter 35, and cue counter 37.

Figure 2:
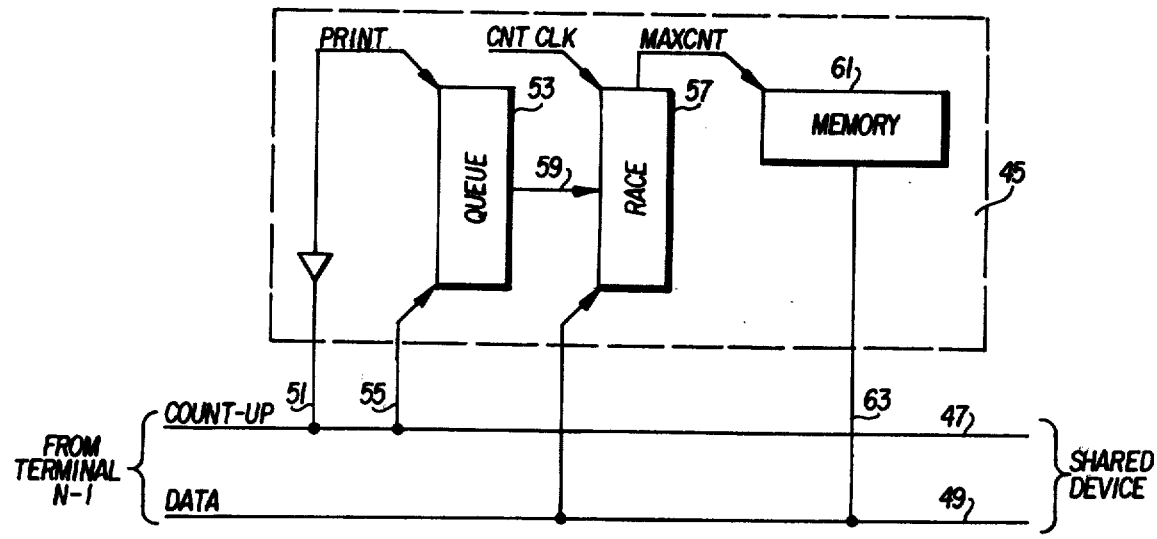
FIG. 2 is a representative of the priority control and data storage means within each requesting unit.

FIG. 2 schematically shows the interconnection of the queue counter, race counter and memory within the terminal 45 and the connection of the terminal to the count-up line 47 and data line 49 which serially interconnect the terminals with the shared device. When an access request is initiated from terminal 45 such as in the case of a terminal requesting access to a shared printer on command of the CPU an output is provided over line 51 to the count-up line 47 such that the queue counters of all the terminals awaiting access to the shared device are counted up by one value. Likewise, if one of the other terminals serially interconnected with terminal 45 requests access to the shared device the queue counter 53 within terminal 45 is incremented over line 55 by a signal on the count-up line 47. The shared device is determined to become available when there has been no transfer of data along data line 49 within a predescribed time interval. This interval would normally be at least the amount of time required to transfer a character over the data line 49 to the shared device. If no data is sensed within that predetermined time then it is determined that the shared device is free and may be accessed by any of the requesting terminals. In relation to terminal 45 the race counter 57 is supplied with the count in the queue counter 53 over line 59 upon the determination that the shared device is available for access. The race counter 57 is incremented by the count clock until either it or another one of the other race counters within the stations in the system first reaches a predetermined maximum count. If it is terminal 45 that has reached the maximum count first, the memory 61 is instructed to transfer the data stored therein over line 63 to the data line 49 and from there to the shared device. When the transmission of the data stored in memory 61 has been completed the shared device once again becomes available to any terminals which may be requesting access. If terminal 45 had not reached the maximum count first then the race within the race counter 57 is discontinued and the previously stored value in queue counter 53 is restored therein and the terminal 45 again waits for inactivity on data line 49 to indicate that the shared device is available for access.

Figure 3:
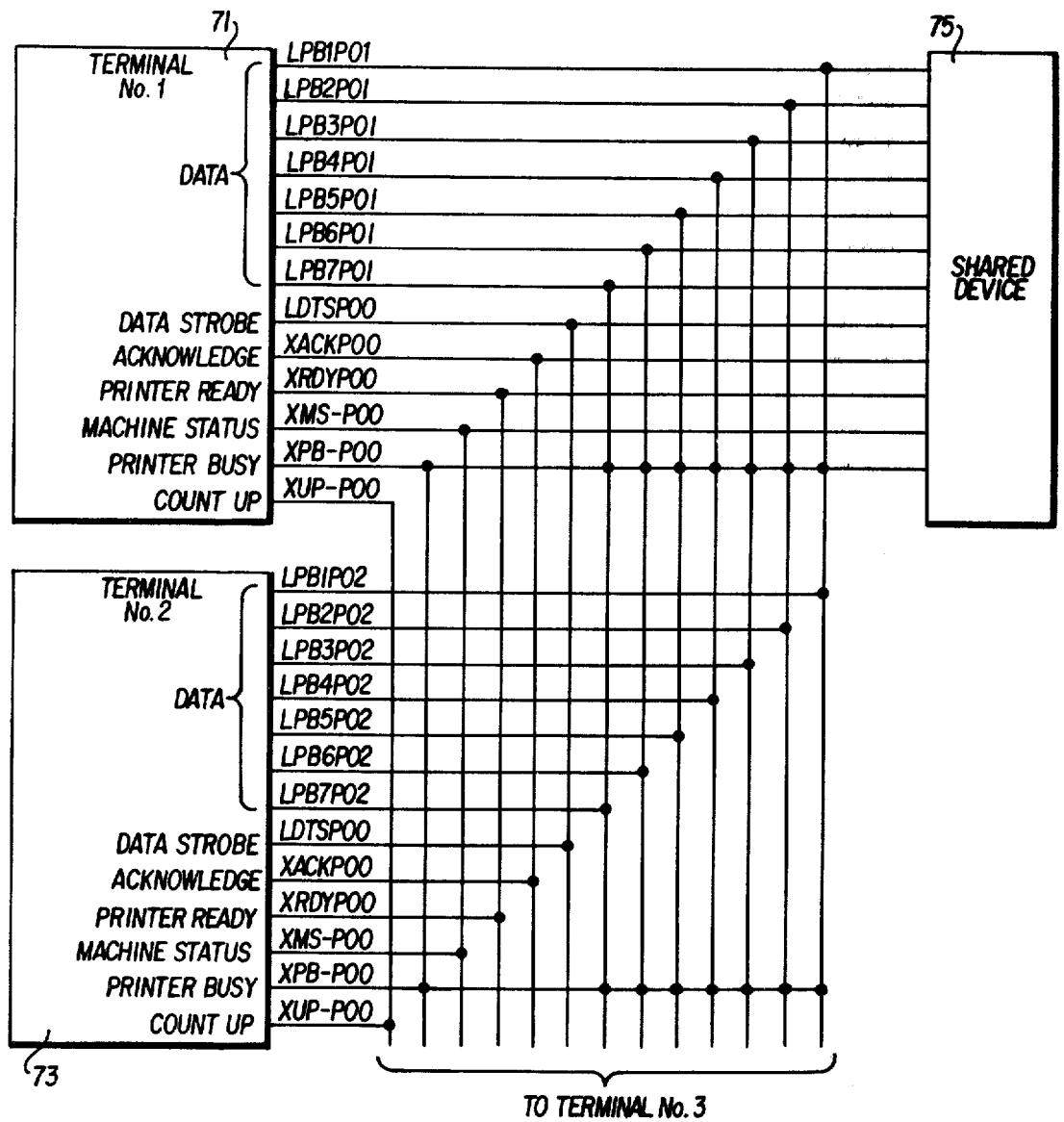
FIG. 3 is a schematic representation of two requesting units and the shared device showing the signals which are bidirectionally communicated between the shared device and the requesting units.

FIG. 3 shows in more detail the bidirectional transfer of control information between the serially interconnected terminals 71 and 73 and the shared device 75. Referring to terminal 71, the data lines LPB1P01-LPB7P01 are employed to transfer ASCII characters from the memory of terminal 1 to the shared device. As was previously mentioned, a determination is made whether the shared device 75 is busy by monitoring the data lines to see if any characters have been transferred to the shared device within a prescribed time interval. For this reason the data lines LPB1P01-LPB7P01 are shown to also be connected to terminal 73 and to any other terminals in the system. Terminal 71 also provides a data strobe line LDTSP00 for synchronizing the transfer of the data to the shared device when terminal 71 has been granted access to the shared device. Terminal 71 receives control signals from the shared device in the form of an acknowledge signal XACKP00, printer ready XRDYP00, machine status XMS-P00, printer busy XPB-P00 and count-up XUP-P00. Again, the printer busy line XPB-P00 is shown to monitor the data lines such that a determination whether the shared device 75 is busy or free is dependent upon the transfer of information to the shared device.

Terminal 73 contains its own data lines LPB1P02-LPB7P02 as well as data strobe line and the control lines acknowledge, device ready, machine status, device busy and count-up. The use of the control signals to maintain the priority sequence of terminals which have requested access to the shared device will be hereinafter discussed in further detail.

Figure 4A:
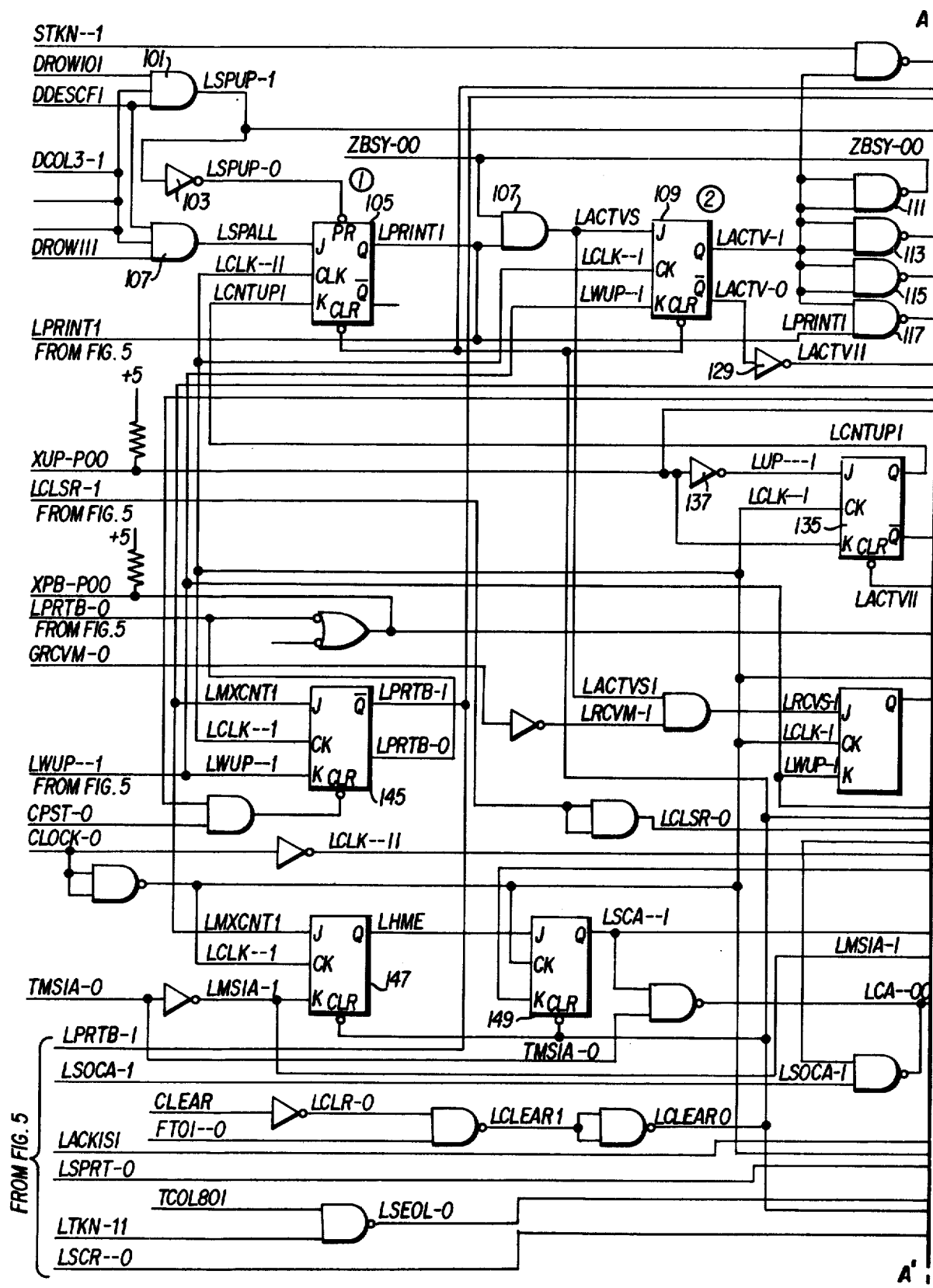
FIGS. 4a and 4b are schematic representations of a logical embodiment of the dynamic priority ordering system.
Figure 4B:
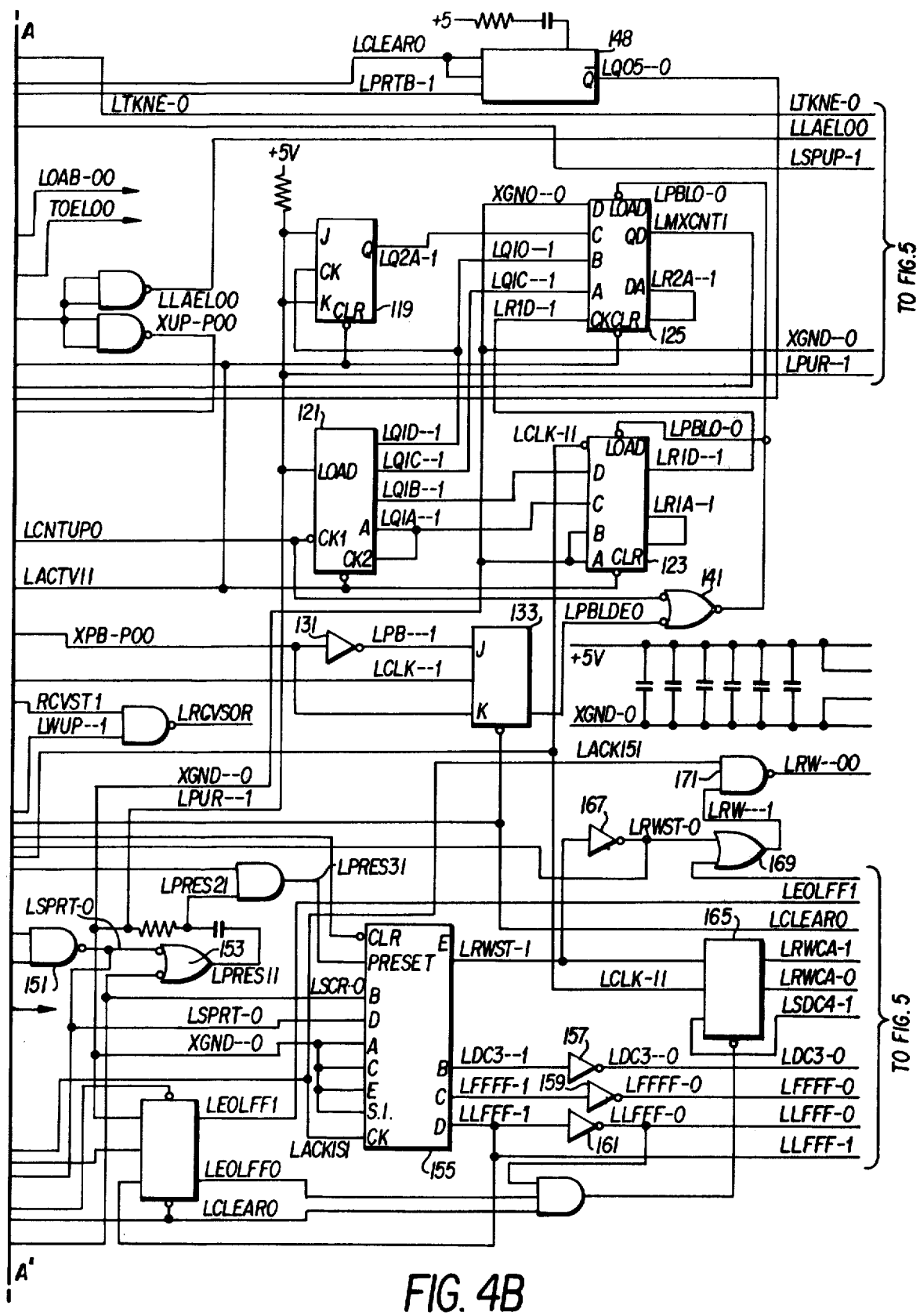

FIGS. 4A and 4B should be considered together as a detailed circuit diagram which shows how the instant priority system is implemented. As is previously mentioned the environment includes a central computer which communicates in parallel to a plurality of stations. Each station in turn is serially interconnected with the other stations and with the shared device and under the proper command the central computer can direct a station to attempt to access the shared device to transfer information from the station to the shared device. It should be understood that the central computer can direct a plurality of stations to access a shared device and that is in this instance that the priority system is employed to insure that the stations are granted access to the shared device in the same order as they initiated their access requests.

In the embodiment as previously described the stations are data entry or display terminals and the shared device is a remote printer and it is in this environment that FIGS. 4A and 4B will be explained. It is, however, quite apparent that the priority system as disclosed is applicable in many other non-printing environments.

Referring more particularly to FIG. 4A, AND gate 101 decodes three signals received from the central computer. The inputs are on line DROW 101, DCOL3-1 and DDESCF1. If all three of these inputs are high LSPUP-1 is high and the central computer is signaling the terminal to print only unprotected portions of the display message displayed on the terminal. This signal LSPUP-1 is inverted by inverter 103 and supplied as LSPUP-0 to JK flip-flop 105. If entire display screen is to be printed the central computer will supply to AND gate 107 the signals DDESCF1, DCOL3-1 and DROW111. In this case AND gate 107 supplies a high output LSPALL to JK flip-flop 105. Flip-flop 105 is the print flip-flop and its output is LPRINT1 which when in a high value indicates that the terminal has been instructed to print on the remote printer and, therefore, a request for access to this shared device must be generated. AND gate 107 is employed to determine whether the terminal is currently active and therefore unable to accept another print command. The AND gate 107 receives as input ZBSY-00 and LPRINT1 and when both are high the terminal is capable of entering the active state which is accomplished by AND gate 107 supplying a high value LACTVS to JK flip-flop 109. Flip-flop 109 is clocked by the system LCKL-1 and will signal a high value on LACTV-1 when the terminal is capable of assuming an active state. A series of NAND gates 111, 113, 115 and 117 receive the LACTIV-1 signal and set indicators to various appropriate values. This setting of indicators includes resetting ZBSY-00 to indicate that the terminal is in the busy state and can no longer accept a print request form the central processor.

The queue counter has been previously described and is embodied by JK flip-flop 119 and component 121 in FIG. 4B. The race counter is shown as comprised of elements 123 and 125. The function of the elements 121, 123 and 125 will hereinafter be explained.

Referring back to the $\bar{Q}$ output from flip-flop 109, inverter 129 excepts LACTV-0 and inverts it to its compliment LACTV-11 which is employed to clear the contents of both the queue counter 109, 121 and race counter 123, 125. At this point the terminal has been instructed to print so that the value in its queue counter is reset to 0 as is the value of the race counter and the next operation will be to determine whether the printer is busy or whether the terminal can immediately access the printer.

The indication that the printer is busy is received over line XPB-P00 FIG. 4A which when referring back to FIG. 3 refers to the line XPB-P00 which is supplied as an input to each of the terminals and monitors the transfer of data along the data lines to the shared device. It is evident that one skilled in the art could provide a simple mechanism to monitor the data lines and supply a low value to the XPB-P00 line when there is data being transferred along the lines and a high value to the XPB-P00 line when no data has been transferred across a line for an interval longer than or equal to the minimum transfer time of a character. The XPB-P00 signal is supplied to the J and K inputs of flip-flop 133. The J input is inverted by inverter 131. If XPB-P00 is low indicating printer was busy, the value is inverted and a high value is supplied to the J input of flip-flop 133 and notaction is taken. The terminal will wait until the value of XPB-P00 assumes a high value indicating that the shared printer is available for access from this terminal.

If during this waiting period another terminal in the system requests access to the shared printer, an input is supplied over XUP-P00. This input will be in the form of a high value and is supplied to JK flip-flop 135. The J input is inverted by inverter 137 such that a high value will only be seen at the K input and thus an output will be generated on LCNTUPO and supplied to the queue counter 121 to increment the value in the counter by 1. Again, if there is no change in the value of XPB-P00 the terminal will remain in a state awaiting access to the shared printer and may receive additional count-up pulses from other terminals on XUP-P00 which would result in the queue count of the terminal further increasing. It is important to note that for every LCNTUPO input supplied to the queue counter 121 the value of the queue counter is transferred to the race counter 123 so that in the event that the printer becomes available the race counter will be counted from the current value in the queue counter toward the next maximum count at a rate equal to the frequency of clock CLK-11.

When the value of XPB-P00 goes high indicating that there has been no data transferred to the shared printer within the character transfer time a high value is supplied to the K input of the flip-flop 133 which results in the signal LPBLDEO being supplied through an inverted input to NOR gate 141. The output from NOR gate 141 is supplied to the race counter elements 123 and 125 to initiate a race in the race counter by supplying an input over line LPBLO-0. If the race counter for this particular terminal has the highest initial starting value of any terminal which is awaiting access to the shared printer then this terminal will complete its race to a maximum count. The maximum count value is some arbitrary value and is selected according to the anticipated number of terminals which would be waiting for access to the shared device at any particular time.

If the maximum count is reached by race counter 123 and 125 LMXCNT1 goes high and this input is supplied to the J input of JK flip-flop 145. This sets LPRTB-1 to one and indicates within the terminal that it has gained access to the shared printing device and should now prepare to transfer data from the memory in the terminal to the shared printing device.

A first step in initiating transfer of data between the memory of the terminal and the shared printer is accomplished by LMXCNT1 being supplied to the J input of JK flip-flop 147 such that a LHME-1 signal is generated as the J input of flip-flop 149. This triggers a LSCA--1 value from the Q output which is decoded by NAND gate 151 to generate LSPRT-0 signal. This signal is supplied at an inverted input to OR gate 153 and returned to shift register 155 such that the shift register is pre-set to transfer a LDC3--1 signal to inverter 157.

Figure 5A:
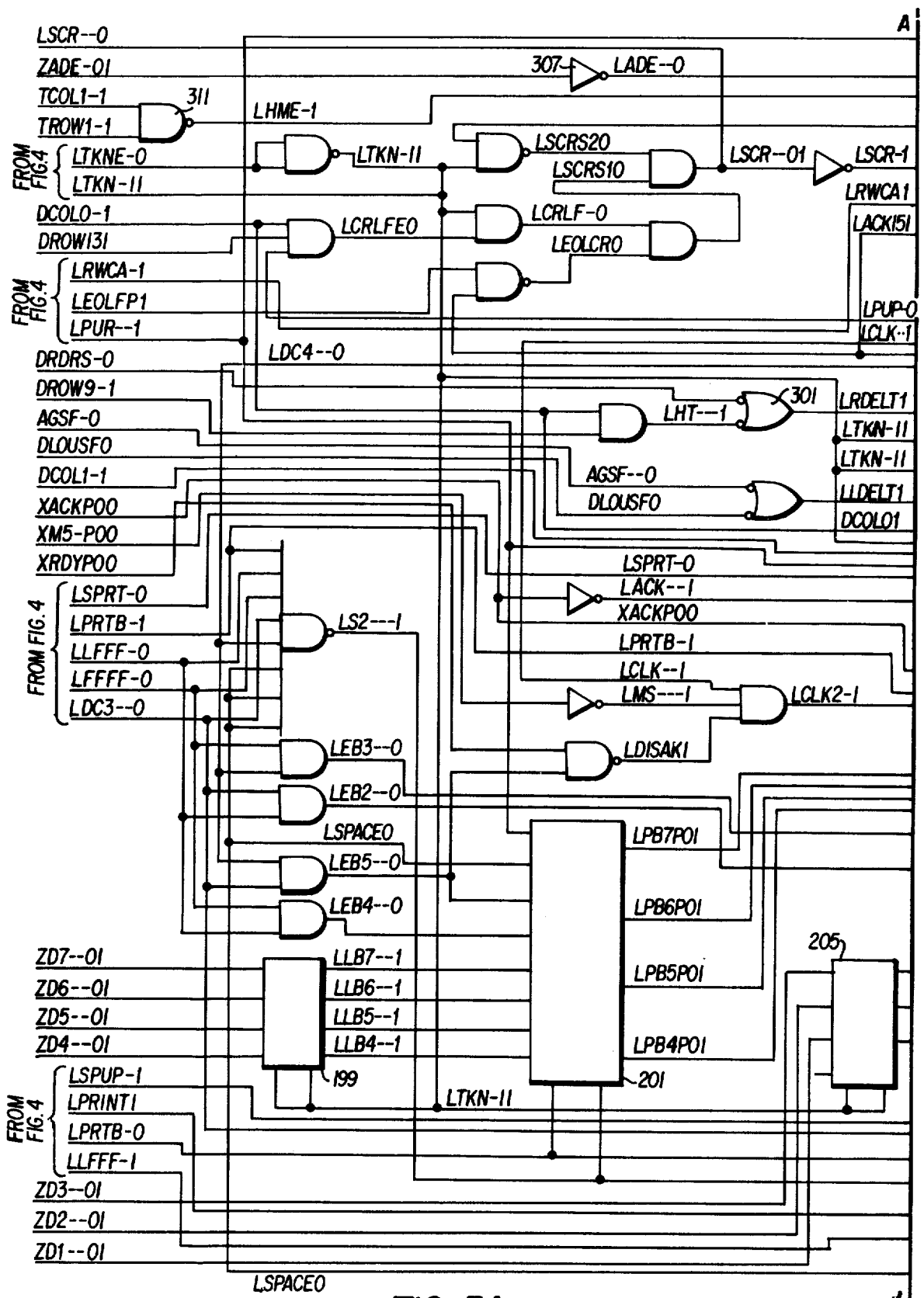
FIGS. 5a and 5b are schematic representations of a logical embodiment of the data transfer circuit within each requesting unit.
Figure 5B:
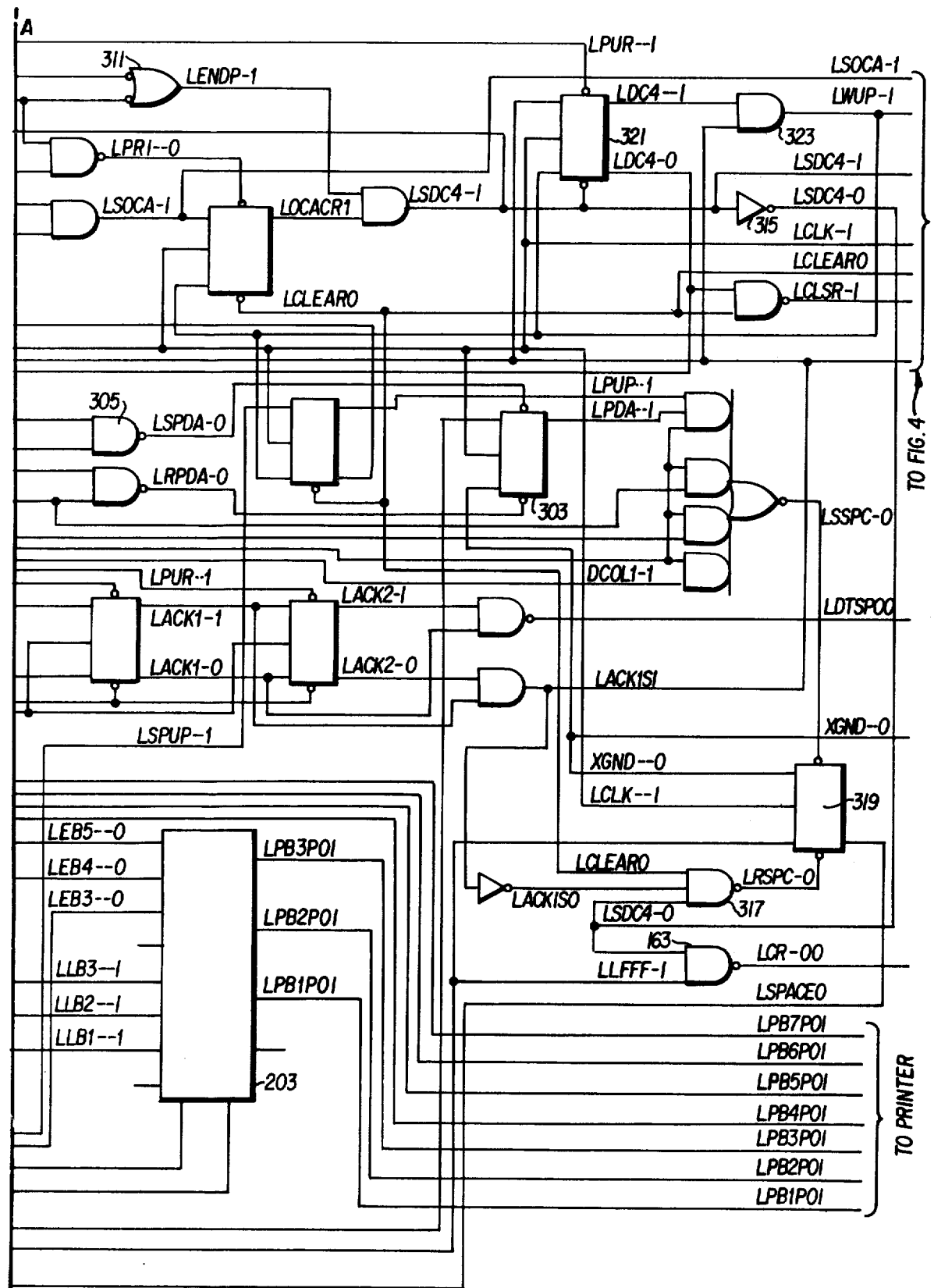
Figure 6:
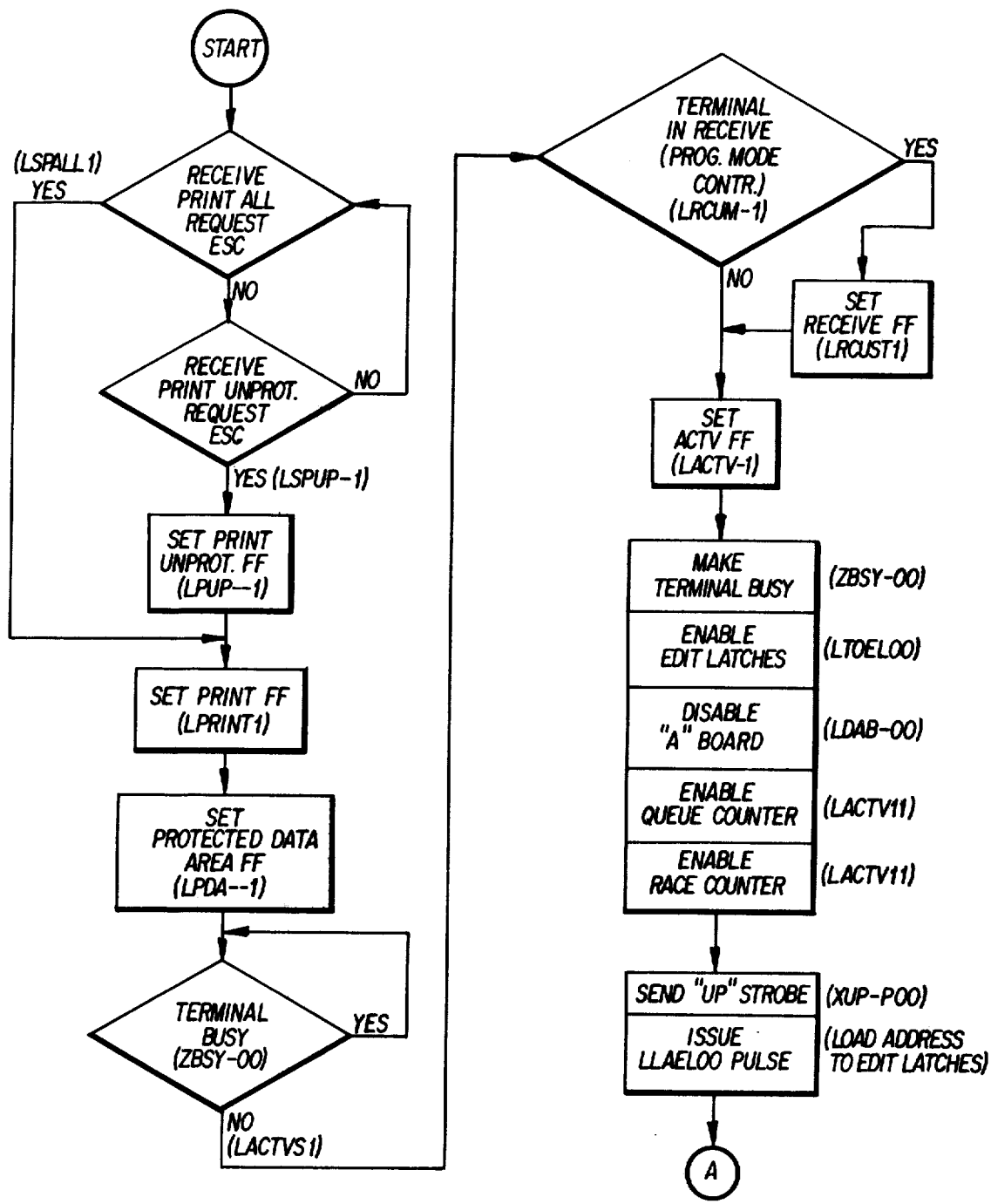
FIGS. 6–10 in logic flow diagram form show how the dynamic priority ordering system is implemented.
Figure 7:
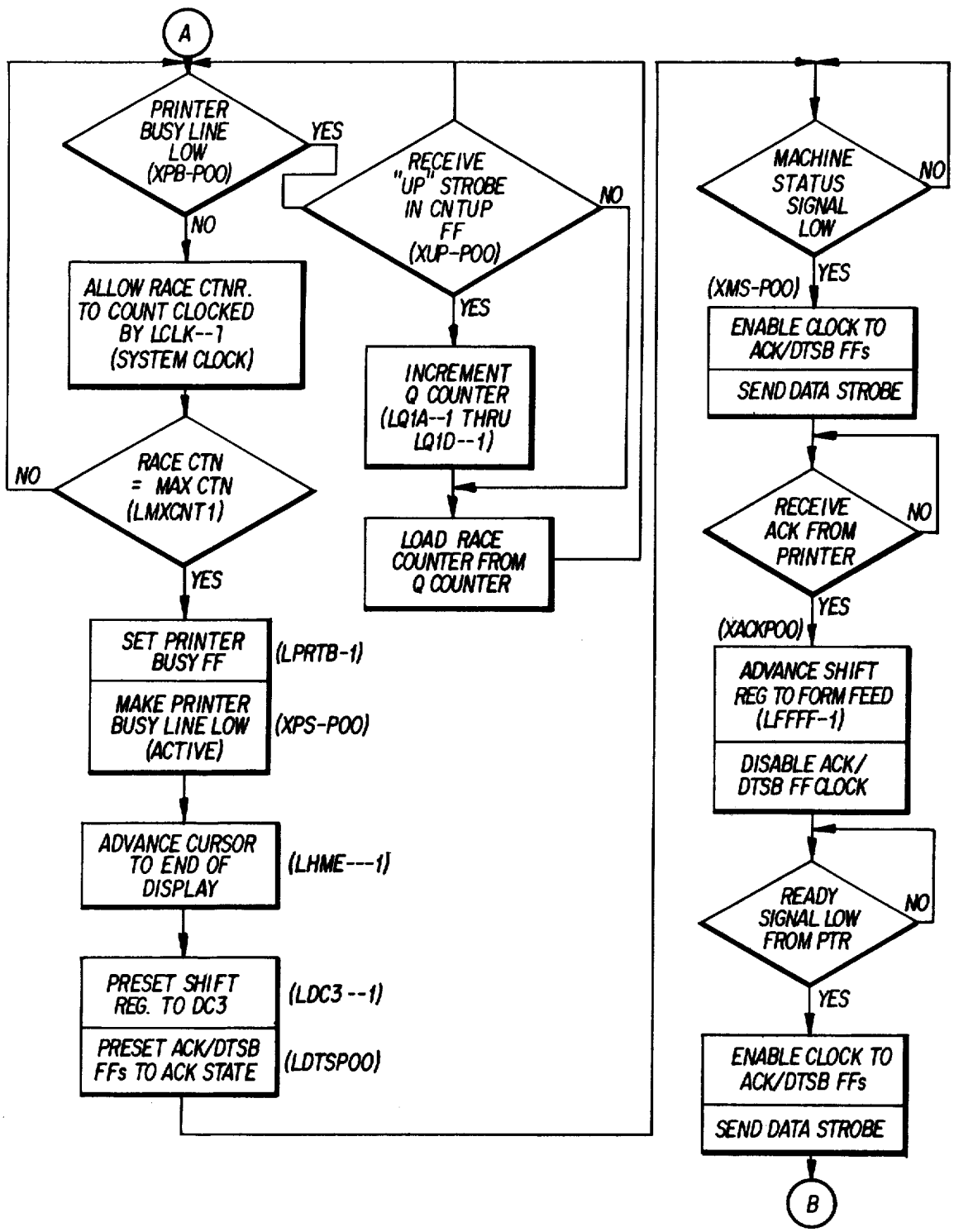

This now requires reference to FIGS. 5A and 5B which are an embodiment of logic employed to alert the shared printer that this particular terminal has been granted the access in the priority scheme and determine whether the printer is ready to receive data from the terminal. If the printer is in a condition to receive such data it will respond to all inquires from the terminal with a LACK1S1 signal being high. Referring back to FIG. 4A this signal is received and is employed to shift the shift register such that a LFFFF-1 signal is generated and inverted through inverter 159 and once again supplied to the logic circuitry in FIG. 5A. When the acknowledge signal is received from the printer in the form of LACK151 assuming a high value, the shift register 155 is shifted one further position and a LLFFF-1 signal is provided to inverter 161 to generate an LLFFF-0 signal. This signal is supplied to the logic circuitry of FIG. 5A and results in a line feed of the print receiving web within the shared printer. As can be seen in FIGS. 5A and 5B the LLFFF-1 signal is supplied to NAND gate 163 to also generate a carriage return signal LCR-00 which is transmitted to the printer affect the carriage return.

When the acknowledge signal LACK1S1 is received from the shared printer the shift register 155 (FIG. 4B) is advanced to the read state wherein signal LRWST-1 is generated and supplied to the flip-flop 165. This sets LRWCA-1 to a high value and this value is supplied the circuit in FIGS. 5A and 5B. The LRWST-1 is supplied to OR gate 169 in an inverted value because of inverter 167. This sets the read/write cursor advance flip-flop. If the read/write which was issued from the terminal to the printer is acknowledged by the printer an input will be received by the terminal over line LTKN-11.

After the read/write signal is acknowledged by the shared printer, data is fetched one character at a time from the memory of the terminal. The seven bits which comprise each character are supplied from the memory over lines ZD1-01 through ZD7--01 (FIG. 5A). The high value on LTKN-11 results in the switching elements 199 and 205 transferring the data bits which comprise the character into latches 201 and 203. Before the data is transferred to the printer from the terminal it is examined to see if it contains certain characters which would be considered control characters and not data characters. These characters will comprise ASCII characters such as right delete, left delete, and print unprotected. Also the data will be examined to see if it is a character line feed or carriage advance. While these signals are processed by the circuitry shown in FIGS. 5A and 5B and are necessary in order for data to be transferred from the terminal to the shared printer an exact description of how these signals are interpreted will not be provided since it is considered that one skilled in the art could examine the logic circuit as set forth in FIGS. 5A and 5B and easily follow the processing of these characters.

Figure 8:
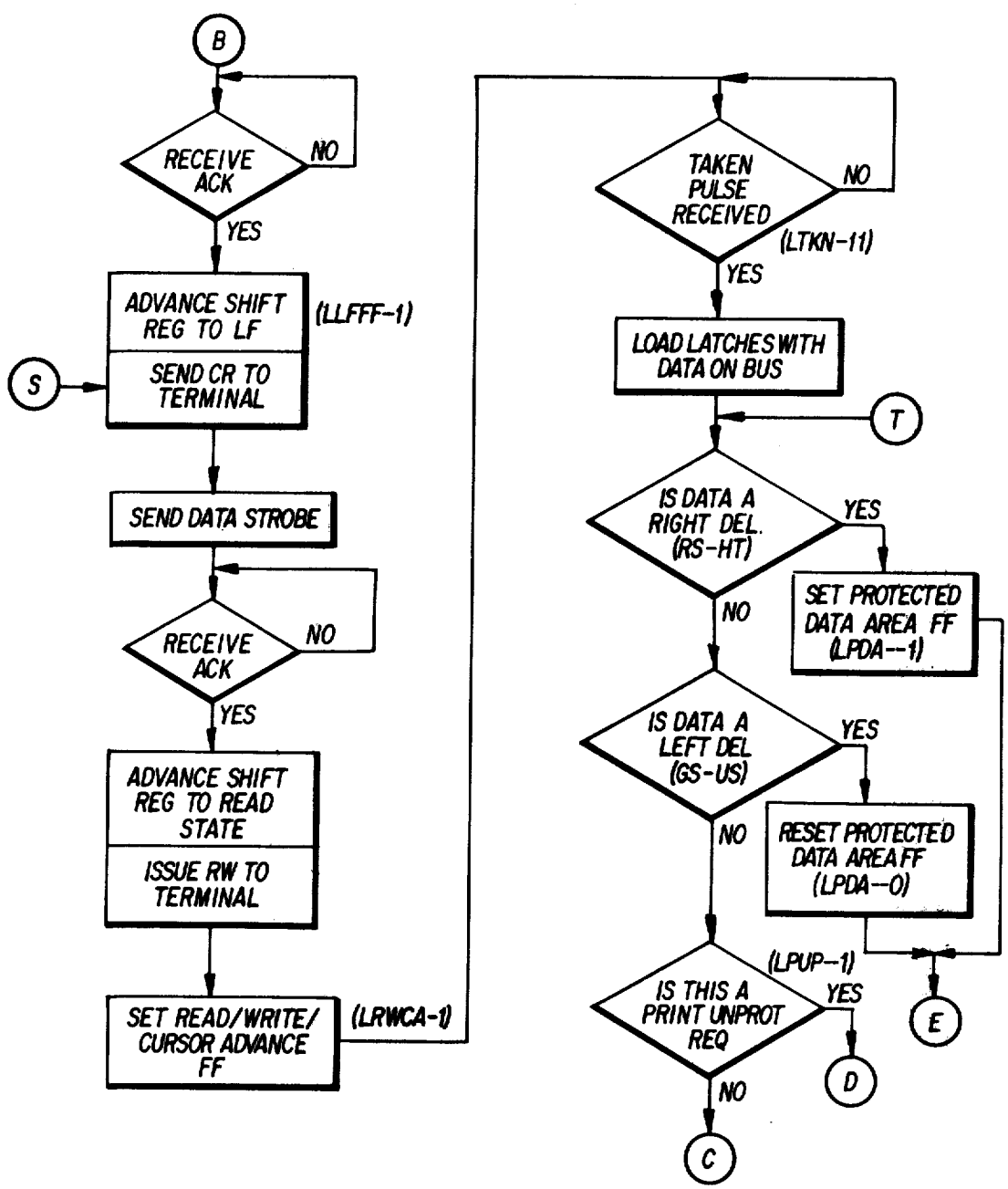
Figure 9:
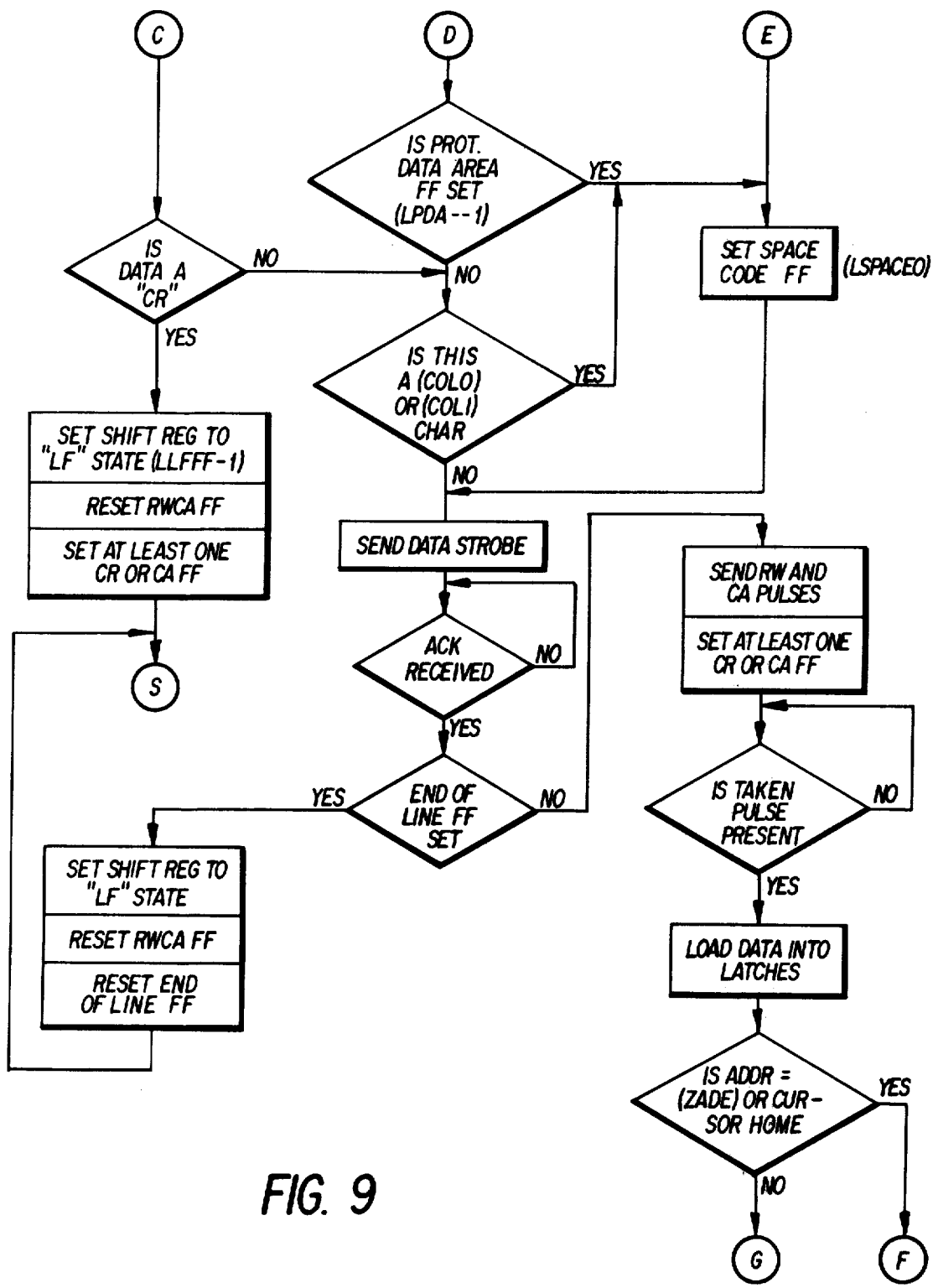
Figure 10:
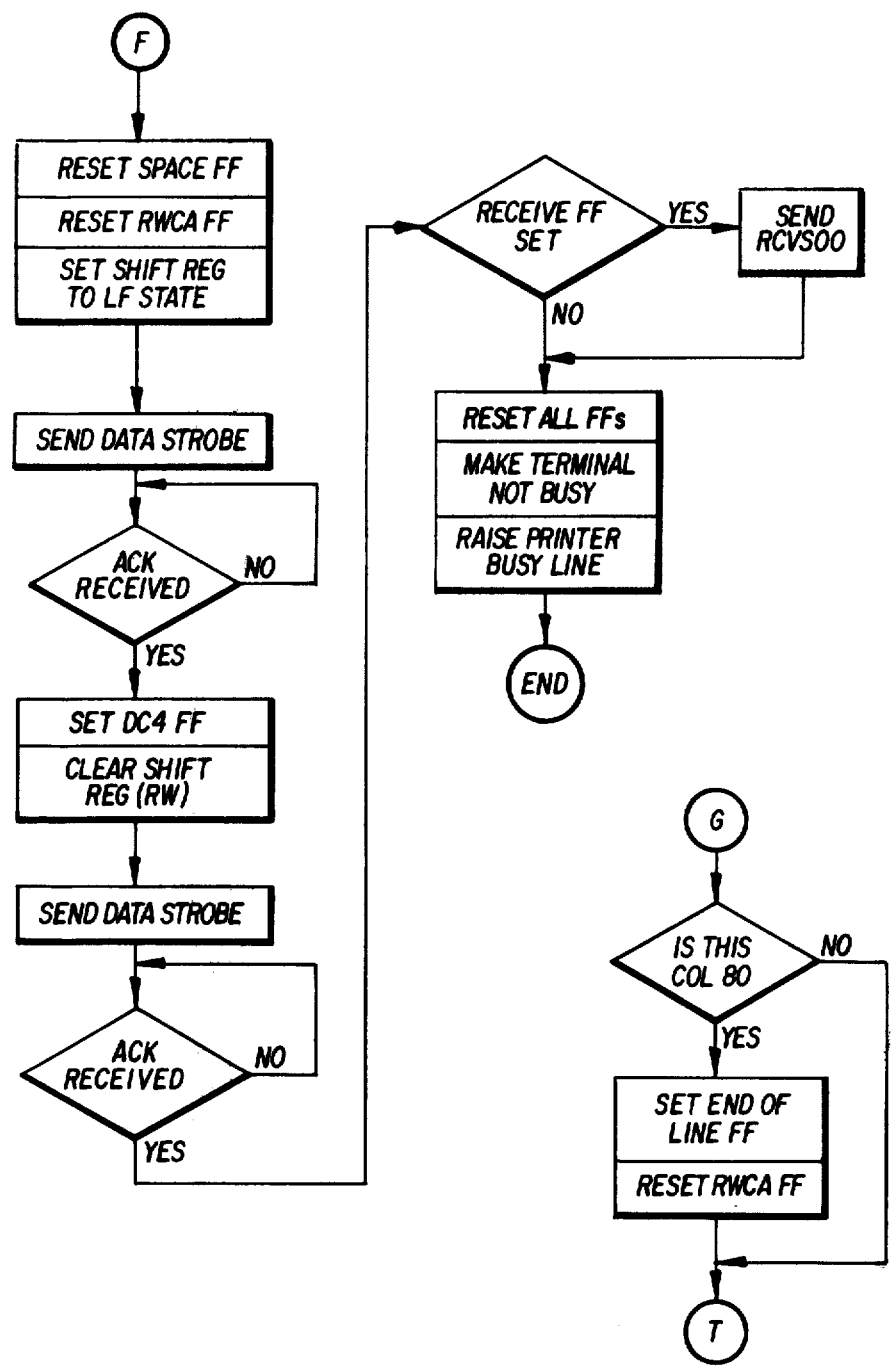

In further reference to FIGS. 5A and 5B the data which has been transferred to latches 201 and 203 from the memory of the terminal is transmitted to the printer over lines LPB1P01 through LPB7P01. Reference to the flow diagram in particular FIGS. 8–10 will make it readily apparent to one skilled in the art how these signals are processed.

Once all the data has been transferred from the memory of the terminal to the shared printer the printer must be returned to the not busy state and the terminal also be placed in the not busy state. This is accomplished by the data in the latches being either a cursor home signal or when the address within the memory which is being accessed for data corresponds to the ending access of the data buffer. In reference to FIGS. 5A and 5B if the ending address is reached ZADE-01 will assume a high value which is inverted by 307. If the character being examined is a cursor home then TCOL1-1 and TROW1-1 are decoded by NAND gate 311 (FIG. 5A) and a high value of LHME-1 is provided along with the LADE-0 signal to inverted inputs of OR gate 311. If any of these values were inverted as high, LENDP-1 assumes a high value and since a carriage return signal had been previously supplied to the printer from the terminal both inputs to AND gate 313 will be high and LSDC4-1 will assume a high value and LSDC4-0 will go low through inverter 315. The low value of LSDC4-0 is passed to NAND gate 317 which clears the space flip-flop 319. The LSDC4-1 signal when its assumes a high value is used to reset the read/write flip-flop 165 (FIG. 4B) and by passing through the OR gate 164 will be passed through NAND gate 171 resulting in LRW-00 assuming a high value. A data strobe is set to the printer and if an acknowledge is returned the DC4 flip-flop 321 (FIG. 5B) will be set and since the inputs to AND gate 323 are the LDC4-1 the acknowledge signal LACK1S1, LWUP-1 goes high all the flip-flops are reset and as can be seen in FIGS. 4A and 4B the terminal active flip-flop 109 is also reset. Meanwhile the printer busy line will be reset through flip-flop 125 and since no further data will be transmitted from this terminal to the shared printer the printer will become available for access by the terminal that has the highest queue count.

To summarize the operation of the described dynamic priority system for controlling the access of stations to a shared device it has been disclosed that two counters are maintained within each station which shares the device. The queue counter retains a value which directly reflects the priority of a terminal which has unsuccesively requested access to a shared device. The value in the queue counter is reset when a station requests access to a shared device. If such access is not granted the terminal awaits an indication of the shared device becoming available for access. In the interim, the queue counter within the waiting station is incremented for each unsuccessful access request by another station which is sharing the same device. It is in access request order that the relative priority between the stations awaiting access to the shared device is maintained. When the shared device is determined to be available because of the lack of transfer of characters to the shared device within a predetermined time period the value in the queue counters of each awaiting station is transferred to their respective race counters and the race counters are clocked at a uniform rate until one of the race counters exceeds a predetermined maximum count. The terminal exceeding this maximum count is granted access to the shared device and the remaining terminals are returned to the waiting state. Again, the queue counters within each of the waiting stations will be incremented whenever another station unsuccessfully requests access to the shared device. When the shared device becomes available for access then another race is initiated and the station which has the queue counter with the highest value will be granted access to the shared device.

It should be understood that there are numerous other ways of determining whether the shared device is available for access and that a race should be initiated. A separate line could be provided to serially interconnect the stations with the terminal and the state of this line would communicate to each of the awaiting stations whether the shared device is available. In the preferred embodiment it is by monitoring the transfer of data between the station and the accessed shared device which determines whether the shared device available for access by another station. Any time interval can be selected with the understanding that if the time interval is less than the character transfer time races will be continually initiated amongst the waiting stations. The only constraint in this embodiment is that a race not be completed from the queue count of the station having the highest count and the maximum count in an interval which is less than the interval required for transferring a data character from a terminal to the shared device.

FIGS. 6–10 set forth in flowchart manner the functioning of the herein described system. If the flowcharts are considered in conjunction with FIGS. 4A and 4B and FIGS. 5A and 5B is should be readily apparent to one skilled in the art how the disclosed circuitry implements the priority allocating system. The signal identified in FIGS. 6–10 correspond to the identifiers in the circuits shown in FIGS. 4A and 4B, 5A and 5B.

The foregoing description of a system and logical circuit implementation are intended to be explanatory of a dynamic priority system for controlling the access of a plurality of stations to a shared device. It will be understood from the foregoing that various changes may be made in the preferred embodiment illustrated herein, and it is intended that the foregoing materials be taken as illustrative only and not in a limiting sense. The scope of the invention is defined by the following claims.

What is claimed is:

1. A dynamic priority system for controlling the access of a plurality of requesting stations to a shared device serially interconnected to the stations comprising:

access priority storage means within each station for storing a first priority value when its associated station initially requests access to the shared device and successively incremented priority values whenever another station subsequently requests access to the shared device;

data storage means within each station for storing informational data to be transferred to said shared device;

shared device monitoring means within each station for signaling when the shared device is in a busy state or an accessible state;

access allocating means within each station receiving the priority value stored in its associated priority storage means in response to a shared device accessible signal from its associated monitoring means for continuously incrementing said received value until the value in one of the access allocating means of one of said requesting stations exceeds a preselected value whereby the requesting station exceeding this value is allocated access to said shared device and the remaining stations are inhibited from accessing said shared device.

2. The dynamic priority system of claim 1 wherein the data stored in the data storage means of said station allocated access to said shared device is transferred to said shared devices.

3. The dynamic priority system of claim 2 wherein said priority storage means comprises a digital queue counter which is reset to zero when its associated station requests access to said shared device and is incremented by one whenever another station subsequently requests access to said shared device.

4. The dynamic priority system of claim 3 wherein said access allocating means within each station comprises a race counter.

5. The access priority system of claim 4 wherein said shared device monitoring means signals said shared device is in an accessible state when no data is transferred to said shared device from one of said stations within a preselected time interval.

6. The access priority system of claim 5 further including a system clock for supplying clock pulses to its associated race counter.

7. The access priority system of claim 6 wherein the count in said queue counter is transferred to said race counter in response to said shared device accessible signal and said race counter is incremented by said system clock.

8. The access priority system of claim 7 wherein the race counter in each station is reset to zero when said stations are inhibited from accessing said shared devices.

9. The access priority system of claim 8 wherein access to said shared device is allocated to said access requesting stations in the same order as the order of said access requests.

10. A system for allocating to a plurality of access requesting stations access to a shared device in the order of said access requests comprising:

access priority storage means within each station for storing a value corresponding to the access priority of its associated station;

means in each of said stations for dynamically adjusting said access priority values whenever another station subsequently requests access to said shared device;

shared device monitoring means within each station for signaling when said shared device is available for access; and access allocating means within each station coupled to its associated access priority storage means for allocating access to the requesting station with the highest priority value in response to a signal indicating said shared device is available for access, whereby said access allocating means receives said value corresponding to the access priority of its associated station and dynamically adjusts said received value until the value in one of the access allocating means of one of said requesting stations exceeds a preselected value, said requesting station receiving this value being allocated access to the shared device, and for inhibiting access to said shared device by all other stations requesting access.

11. The system of claim 10 further including a central computer coupled to each of said stations for transferring data to said stations and for initiating access requests to said shared device by said stations.

12. The system of claim 11 wherein each of said stations further includes a memory storage means for storing data transferred from said central computer.

13. The system of claim 12 wherein said shared device is a printer.

14. The system of claim 13 wherein said station allocated access to said printer transfers to said printer the data stored in its memory storage means for printing by said printer.

15. The system of claim 10 wherein said access priority storage means in each of said stations comprises a digital queue counter which is reset to zero when its associated station requests access to said shared device.

16. The system of claim 15 wherein said dynamic priority adjusting means comprises means for incrementing its associated queue counter in response to said subsequent access requests.

17. The system of claim 16 further including a system clock for generating clock pulses.

18. The system of claim 17 wherein said access allocating means comprises a digital race counter coupled to said queue counter and incremented by said clock pulses in response to a signal from said shared device monitoring means until the count in one of said race counter exceeds a preselected value.

19. The system of claim 18 wherein said station associated with said race counter incremented to exceed said preselected value is allocated access to said shared device.

* * * * *